United States Patent [19]

Engelhardt et al.

[11] Patent Number: 4,605,145

[45] Date of Patent: Aug. 12, 1986

[54] SHEET SEPARATING STRUCTURE

[75] Inventors: Günther Engelhardt, Niederstotzingen; Gerhard Lohrmann, Elchingen, both of Fed. Rep. of Germany

[73] Assignee: Mannesmann AG, Duesseldorf, Fed. Rep. of Germany

[21] Appl. No.: 689,866

[22] Filed: Jan. 9, 1985

[30] Foreign Application Priority Data

Jan. 10, 1984 [DE] Fed. Rep. of Germany ....... 3400894

[51] Int. Cl.[4] .................................... G03B 1/30

[52] U.S. Cl. .................................... 226/74; 226/89

[58] Field of Search ....................... 226/74, 75, 85, 89, 226/90; 225/82, 84, 85-87, 101, 105; 400/621, 400/621.2, 690.1; 312/208, 284

[56] References Cited

U.S. PATENT DOCUMENTS

| | | | |
|---|---|---|---|
| 2,693,237 | 11/1954 | Zinn et al. | 225/84 X |
| 3,513,938 | 5/1970 | Buehner et al. | 400/690.1 X |
| 4,449,763 | 5/1984 | Barnett | 312/208 |

*Primary Examiner*—Leonard D. Christian

*Attorney, Agent, or Firm*—Ralf H. Siegemund

[57] ABSTRACT

A structure is disclosed primarily but not exclusively as a supplement to an existing printer or typewriter or the like, which structure includes a clamping shaft, either for clamping endless sheet stock against the traction device for the stock, or against an added on anvil bar or both.

6 Claims, 5 Drawing Figures

SHEET SEPARATING STRUCTURE

BACKGROUND OF THE INVENTION

The present invention relates to a sheet cutting and separating device using endless sheets with perforation along the edges for purposes of a sprocket type transport; furthermore the sheets are to have transverse tear perforations and are to be used in printers such as matrix printers, typewriters, word-processors etc. It is, moreover, assumed that the invention be practiced in an environment in which sprocket or traction devices are used for guiding the sheet and includes furthermore a sheet guide structure arranged above the casing of the machine.

Sheet separating structures usually serve to facilitate tear off of a completed form possibly with several copies. These structures permit tearing off by hand, possibly without tear edge. The known structures, however, render the overall construction of a printer or a typewriter rather cumbersome, and they become complex and are not very conveniently operable. The construction of such sheet separating device is moreover usually designed for processing the sheet stock in a stretched state. Obtaining the stretched state is an advantage for tearing because in the case of a bulky layer forms the cover as well as the lowest sheet wil not be shifted through unequally long paths.

Sheet-guiding structures with traction devices and traction flaps are known for example through the German printed patent application No. 3,036,642. The traction flaps can be pivoted away in order to thread the edge holes of the paper into the paper guide structure. After the sheets have been inserted, pins of the traction transport the paper and impart upon the paper the requisite advance and feed forces. This kind of paper guide structure requires a certain gap spacing between the traction flaps and the surface of the paper in order to make sure that the tractor flap will not impart a braking force through friction upon the paper merely by engagement. Moreover it must be made sure that only the pins entering the apertures along the edges provide the full advancing force upon the bundle of sheets in their entirety. Depending upon the number of copies overlaid this gap may be filled completely.

DESCRIPTION OF THE INVENTION

It is an object of the present invention to separate completed forms from a basically endless sheet stock material advanced under utilization of edge perforations and to provide a so called quick tear and mere utilization of the transverse perforation without requiring a tear edge which may introduce a complicating aspect into the machine.

It is a particular object of the present invention to provide a new and improved structure for tearing off individual sheets, or overlaid bundles of sheets, from an endless supply of sheet stock as it is used in and passed through a typewriter, printer or the like, under the assumption that traction devices are provided for guiding the sheet through engagement with the edge perforations.

In accordance with the preferred embodiment of the present invention, a form or sheet separating structure is suggested by providing on the outside of the machine (typewriter, printer or the like) a clamping drive being connected to a clamping shaft running along the front of the machine and being associated with clamping elements such that the endless sheet can be clamped firmly in the range of the transverse tear perforations. This way one obtains a quick tear operation which is, for example, of advantage in devices where fast separation is necessary. This is the case, for example, in printers for airline tickets or the like. Operating the clamping device manually permits the user to use his or her other hand for tearing off the form or sheet or overlaid bundle of sheets along the tear perforations.

The principle of this type of quick tear can be realized by means of several different configurations. In one instance one makes use of, basically, existing traction flaps being disposed in the edge area of the sheet stock, and use them as clamping element for this sheet stock. In this case one does not need any tear edge but from a practical point of view one will use this approach only if there are a few overlaid sheets to be torn off simultaneously. The transmission of the clamping force is supported by attaching pressure elements to the traction flaps which elements are positively operatively acted upon by or connected to the clamping shaft.

In case the number of individual sheets in a bundle is rather high, a tear edge should still be used. In this case one will use a clamping element which is comprised of a section bar fastened to the clamping shaft. This section bar faces an anvil-like bar whenever clamping is provided; the anvil bar is a support for the sheet stock in the casing. The several clamping structures can be used in combination.

In order to apply the invention to a broad range of typewriters, printers, and here particularly to matrix printers, or other writing or printing type office machines it is furthermore suggested that the clamping shaft be journaled for rotation in a supplemental casing and that at least on one end (preferably both ends) of the clamping shaft is provided with an actuating lever which is manually pulled down or up for obtaining clamping action but automatically returns to a normal disposition when released. All this means that the particular separating and quick tear device as per the invention can be added to the already existing office machines.

The actuation of the operating elements and the accessibility of the paper guiding structure are further favored by the fact that the added-on casing and the length of the clamping shaft should correspond to the full width of the respective machine be that a typewriter or a matrix printer. It may be of advantage here to provide the added-on case from a transparent material.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
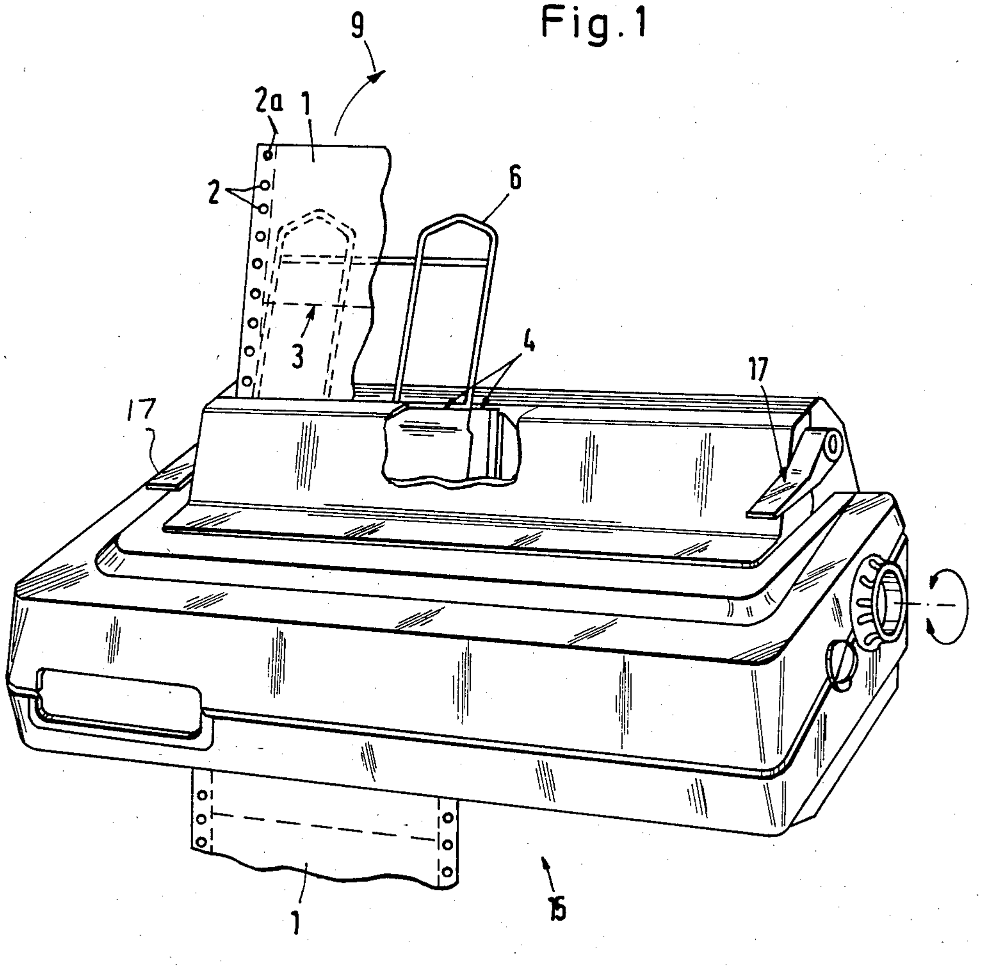
FIG. 1 is a perspective front view of a matrix printer with added on sheet tear structure in accordance with the preferred embodiment of the present invention for practicing the best mode thereof.

Proceeding now to the detailed description of the drawings reference is first made to FIG. 1 but the following general remarks appear to be in order. The device envisioned and disclosed here can be used for sheet separation in all printing or "writing" office machines such as typewriters, printers, particularly matrix printers or the like. Generally speaking endless sheet stock 1 such as are used in such machines are usually provided with edge perforations 2. These perforations extend along the longitudinal edges 2*a* of the sheet stock 1 and they are provided for being engaged by sprockets in a traction device to be described more fully below. In addition such endless sheet stock 1 is provided with transverse tear perforations such as 3 which identifies individual sheets or sheet bundles on the endless sheet stock for purposes of separation. These tear perforations 3 may be arranged to separate for example preprinted forms from each other.

The endless sheet stock 1 has perforations 2 along both edges and they engage sprocket type traction devices 4 such as shown in FIGS. 2, 3, 4, or 5. During printing or writing operation a shaft 11 for the traction devices 4 is driven through a multigear transmission 10 by a motor not shown in detail but provided in the interior of casing 5. The traction devices 4 have belts 12 with sprockets or pins 12*a* engaging the perforations 2*a* of the sheet stock. These transport devices move the sheet stock usually in steps on a line-by-line basis as far as printing is concerned or from a particular position on one form to the corresponding position on the next form. Moroever, as shown for example in FIG. 3, these traction devices 4 are provided with hold down flaps 4*a*, each having a slot to accomodate the sprocket pins 12*a*.

The sheet stock 1 is held and guided outside the traction devices 4 by a structure 6 which is affixed to the casing or housing of the machine whereby for example the printed on sheet stock is run at an inclination of 10 degrees away from the front of the machine where the operator stands or sits. The frame like structure 6 is basically provided for preventing the sheet stock from flapping over towards the person. Moreover the structure 6 establishes a planar disposition for the sheet stock so that the printed-on text can still be read. Furthermore this slot frame like structure 6 establishes actually a good position from which the tear operation can proceed to be described below.

Figure 2:
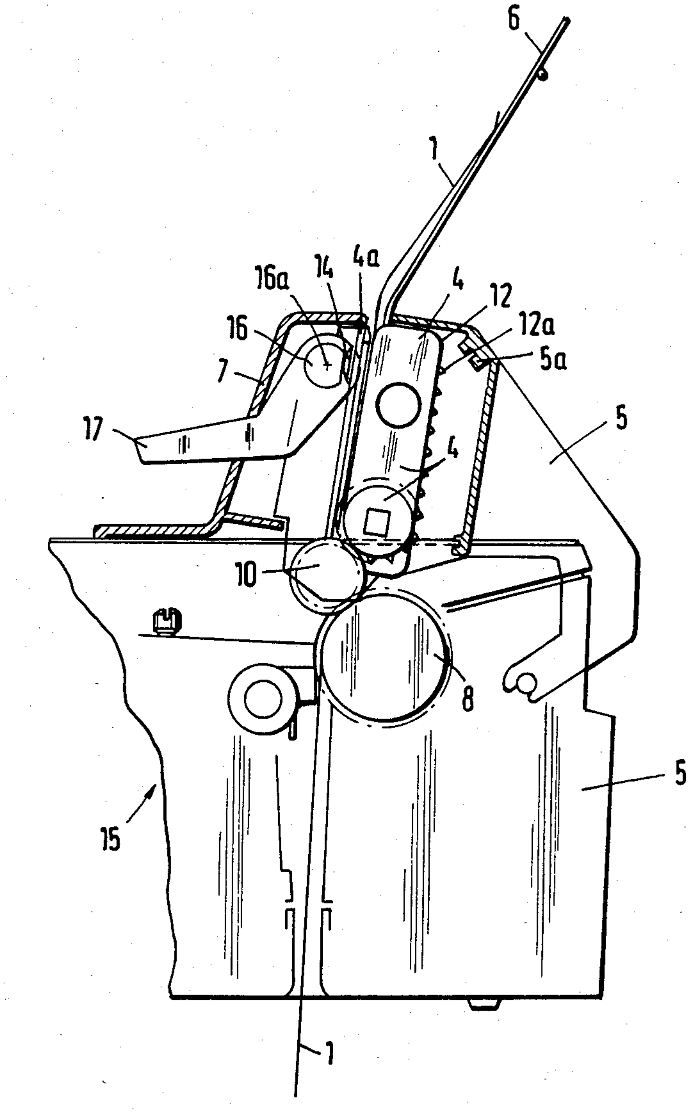
FIG. 2 is a partial vertical cross-section view through the printer shown in FIG. 1 covering particularly the area of the sheet separating structure in the matrix printer.
Figure 3:
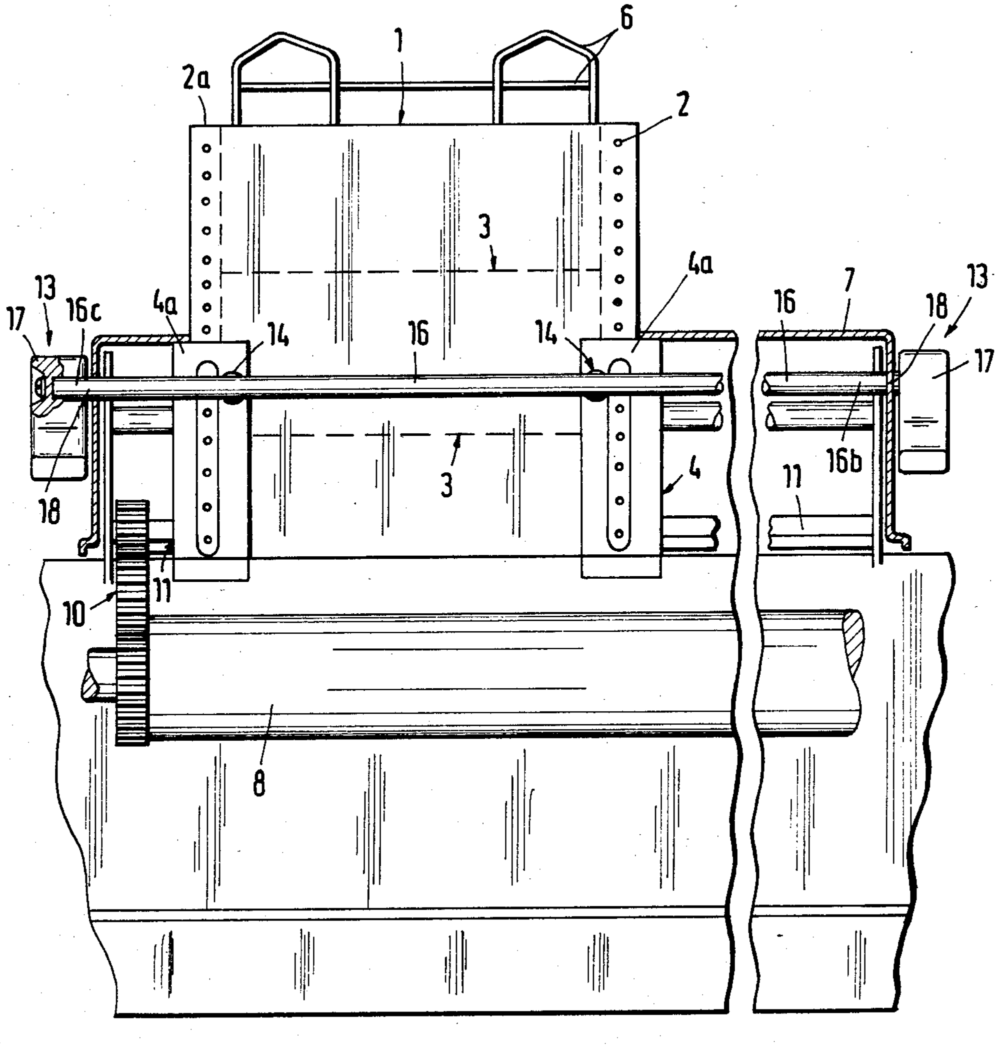
FIG. 3 is a longitudinal section view of FIG. 1, being associated with FIG. 2.

In the example shown in FIGS. 1, 2, and 3 it is assumed that the printer includes a casing 5. This casing 5 carries a supplemental casing 7 which is preferably made of transparent material and is releasably affixed to the casing 5 particularly for threading the front portion of the endless sheet stock into the traction device 4. Insertion and threading is carried out through turning of roll 8 after the supplemental casing 7 has been removed. The release and fastening structure for the case 7 is not shown in detail but can be provided through convenient clamps.

In order to obtain sheet separation along a tear perforation such as 3 a clamping structure 13 is provided which upon being actuated causes the traction flaps 4*a* to hold down and clamp the sheet stock 1 so that a sheet or bundle of sheets can be effortlessly torn off with one hand from the endless sheet stock without utilization of a tear edge; tearing being carried out in the direction of arrow 9 as shown in FIG. 1.

Turning now to the description of details of the clamping structure as it is basically contained in the supplemental casing 7 the clamping force is primarily obtained by increasing the holding force acting on two small pressure surfaces of the unprinted edge zone 2*a*. Pressure or press-on pieces 14 are firmly seated and connected to the traction flap 4*a*. The device 13 includes a clamping shaft 16 which runs along the front of the printer. The clamping shaft 16 is a primary actuator for the clamping structure and is itself manually pivotable through levers 17 which are of course accessible from the outside as far as the supplemental casing 7 is concerned.

The clamping shaft preferably is basically round but has a flattened portion such as indicated by reference numeral 16*a*. This flattened portion 16*a* defines a normal gap vis-a-vis frame 6 as transport part for the sheet stock. The round portion of shaft 16 provides clamping action. The ends 16*b* and 16*c* of the shaft 16 are connected to the actuating levers 17. The levers 17 are preferably spring biased so that they can be simply pushed down with one hand or the other, and upon release they will return the shaft to the initial nonclamping disposition. By providing levers 17 on both sides of the casing either hand can be used for this manipulating operation while the other hand is used to tear sheet off in quick tear fashion.

The clamping shaft 16 is journaled in rotary bearings 18 and extends over the entire front 15. The levers 17 are basically outside the actuating range of immediate printer or typewriter operation while readily accessible on the sides thereof. As stated the clamping operation obtains through turning of the shaft 16. In the unclamping position the flat part 16*a* faces a sheet 1. Upon pressing one of the levers 17 down the round portion of shaft 16 turns and engages the elements 14 on the tractor flaps 4*a* so that in turn these flaps are pressed against the sheet 1 at the marginal portion 2*a* holding the sheet firmly so that the upper portion above the respective exposed tear perforation line can be torn off.

Figure 4:
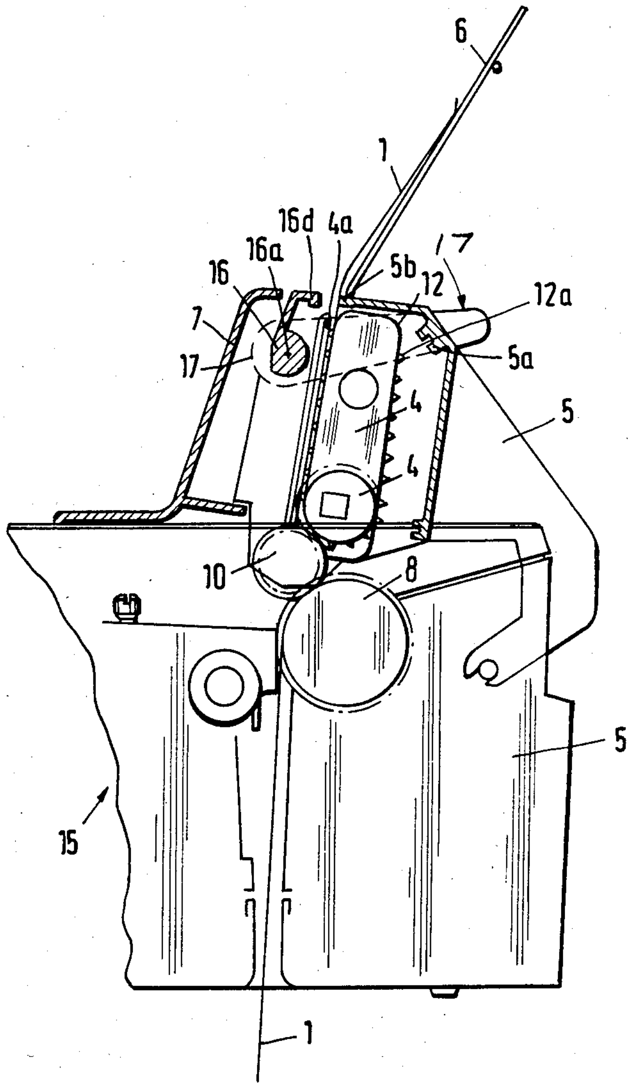
FIG. 4 is a cross section similar to FIG. 2 but showing an alternative example for practicing the preferred embodiment in accordance with the best mode thereof.
Figure 5:
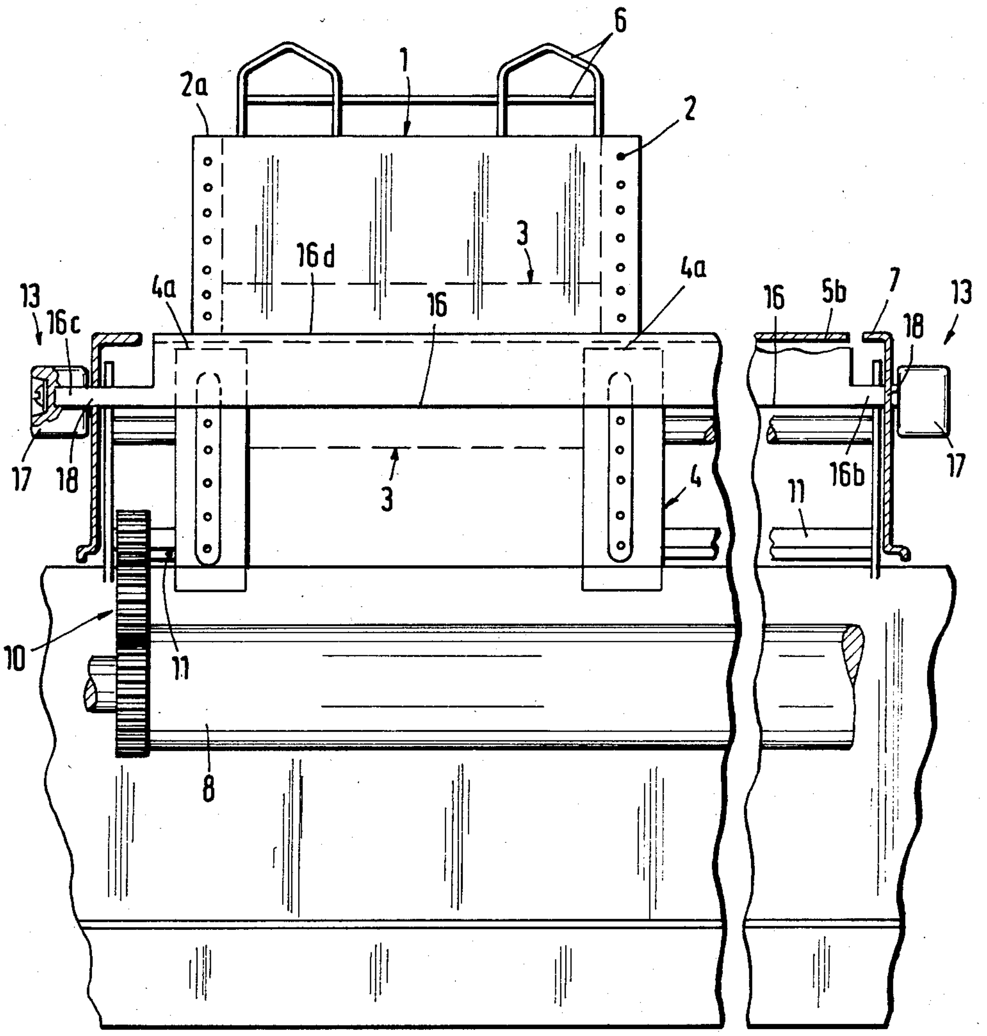
FIG. 5 is a longitudinal section view associated with and corresponding to FIG. 4.

The arrangement shown in FIGS. 4 and 5 includes the parts shown in FIGS. 1, 2, and 3 but the clamping force for facilitating the tearing off, particularly in case the endless sheet is a composite one of multiple superimposed layers is established in that the clamping shaft 16 is combined with a section bar 16*d*. Cooperating with bar 16*d* is an anvil bar 5*b* being attached to the housing 5. The section bar 16*d* in this case clamps specifically the sheet stock across its entire width against the anvil bar 5*b*. This then in fact replaces in structure a tear edge but combines the function of a tear edge with the structure in accordance with this invention. In this case, moreover, it was found to be advantageous to arrange the actuating levers 17 to normally extend rearwardly as can seen best from FIG. 4. In this particular embodiment no special clamping elements such as 14 have to be provided for but it can readily be seen that a combination of the clamping structure is possible in that the clamping anvil on one hand and clamping elements such as 14 on the other hand are both provided to further enhance the clamping action.

The invention is not limited to the embodiments described above but all changes and modifications thereof, not constituting departures from the spirit and scope of the invention, are intended to be included.

We claim:

1. A structure for separating individual sheets or sheet bundles from a sheet stock supply there being transverse tear perforations provided, the structure provided for cooperating with a printer, typewriter, or the like having a housing and including means for transporting and passing such endless sheet stock through the machine; comprising:

a rotatable sheet clamping shaft for providing clamping action;

means for mounting said clamping shaft to said housing, the shaft as so mounted having first, nonclamping and second, clamping positions in relation to said sheet stock as passed through by said means for transporting;

means associated with and operated by said clamping shaft for obtaining clamping of sheet stock in the first position and unclamping in the second position; and means disposed external to said housing and connected to said clamping shaft for turning said clamping shaft to change its disposition, permitting manual tear off of the portion of the clamped sheet stock outside the clamping zone.

2. Structure as in claim 1 said means for transporting including traction means for transporting the sheet stock through the machine, the traction means including traction flaps, said clamping shaft provided to act on said traction flaps to obtain therewith the clamping action.

3. Structure as in claim 2 and including pressure elements on said traction flaps.

4. Structure as in claim 1 and including a stationary anvil bar cooperating with said clamping shaft, said clamping shaft when in the clamping disposition urging said sheet stock against said clamping anvil.

5. Structure as in claim 1 and including a supplemental casing releasably mounted to said machine housing, said clamping shaft being journaled in said supplemental casing.

6. Structure as in claim 5 said supplemental casing being made of transparent material.

* * * * *